Sept. 7, 1965 W. H. SEARIGHT 3,204,537
HIGHWAY ILLUMINATING DEVICE

Filed April 8, 1963 2 Sheets-Sheet 1

INVENTOR.
WILLIAM H. SEARIGHT
BY
ATTORNEY

United States Patent Office 3,204,537
Patented Sept. 7, 1965

3,204,537
HIGHWAY ILLUMINATING DEVICE
William H. Searight, Toledo, Ohio, assignor to Cataphote Corporation, Toledo, Ohio, a corporation of Ohio
Filed Apr. 8, 1963, Ser. No. 271,852
2 Claims. (Cl. 94—1.5)

This application constitutes a continuation-in-part of my application Serial No. 45,720, filed July 27, 1960, and entitled "Highway Illuminating Device," now abandoned.

This invention relates to autoillumination of highways.

Roadways which are of asphalt paving or black top are nonspecular and at night the rays from automobile head lamps do not create adequate illumination to afford a satisfactory factor of safety. In an effort to cope with this problem center lining has been employed to create dual traffic lanes and assist in guiding the motorist. To a degree this is of assistance but fails fully to solve the difficulty and even when the center line is in the form of a paint-like stripe containing retroreflective beads creating a brighter and more visible ribbon, the lanes on either side are still difficult to see even with high powered head lamps for any appreciable distance at night. The high speeds at which motor vehicles travel add to the danger situation.

It is a desideratum to produce a relatively dark light absorbing top roadway which is specular reflective in an extremely simple manner so that, if desired, the entire road surface will be brightly illuminated by the head lamps of the motor vehicle as far as the light beams can travel.

In one aspect this is achieved by spreading over the surface of a light absorbing paved highway a layer of spherical glass beads of relatively high indices of refraction which may be partially embedded in the surface thereof so as to be retained in place. These beads enable the roadway to achieve specular reflection in response to impingement of the light rays from the motor vehicle's head lamps. No glare is created but the entire road surface becomes automatically illuminated.

In another aspect, this invention comprehends the application to a light absorbing highway of a layer of glass beads of relatively high indices of refraction, portions of which may be partially embedded in the surface thereof and which are colored selectively to reflect from the rays of a motor vehicle head lamp a color which will have traffic significance. For example, certain beads may be colored green to designate a traffic lane whereas others may be colored red to caution the motorist against travel in that area. A line of selectively colored beads may be employed to guide the motorist along a particular route, and these will afford specular reflection at night from the automobile head lamps and during the day from normal light reflection.

For purposes of illustration but not of limitation, an embodiment of the invention is shown on the accompanying drawings in which FIGURE 1 is a view of a highway at night showing the same illuminated by the head lamps of a motor vehicle;

Figure 1:
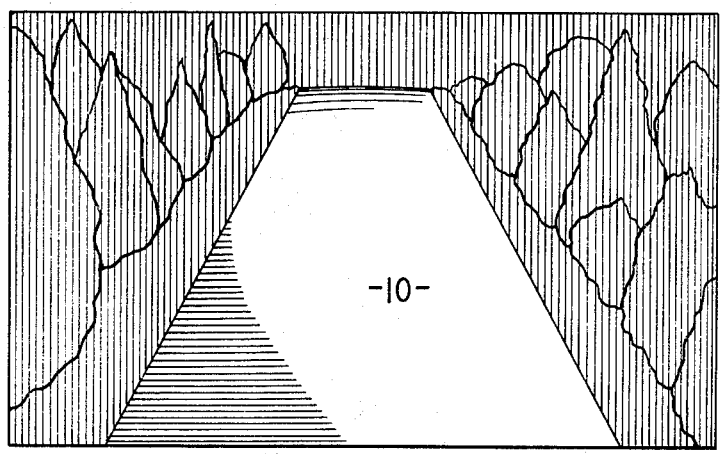

The illustrated embodiment comprises a black top road surface 10 shown in the darkness except for that portion against which the rays of a motor vehicle head lamps impinge. It will be observed that a portion of the road to the left of FIGURE 1 is in darkness since the light rays have not been directed in that manner. Thus it should be noted that so far as the beam of light can project just so much of the road is brilliantly lighted, revealing clearly and unmistakably any ruts or irregularities and of a softness that is free from annoying glare.

Figure 2:
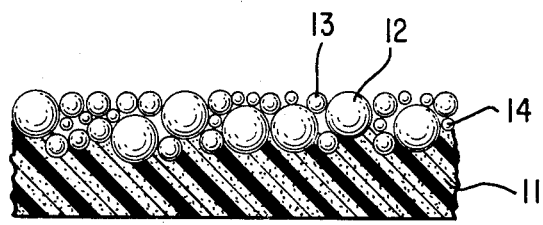
FIGURE 2 is an enlarged fragmentary section of the highway.

The effect above mentioned is achieved by the use of macroscopic glass beads of relatively high indices of refraction on or close to the surface of the roadway. As shown in FIGURE 2, 11 represents the asphalt paving to which is applied in any suitable manner a layer of different size glass beads 12, 13 and 14 during the time that the paving is sufficiently soft and prior to rolling. The rolling embeds the beads in the roadway surface and retains at least a sufficient number in place and at proper elevation to achieve the desired specular reflection when the head lamp beams impinge.

Other means may be employed for adhesively securing the beads to the surface of the road. For example, they may be mixed with a binder and spread over the asphalt paving and rolled into intimate contact with road surface. Alternately the beads may be spread over the surface of the road and then a suitable quick drying binder can be sprayed over the beads in order to adhere them in place.

Figure 3:
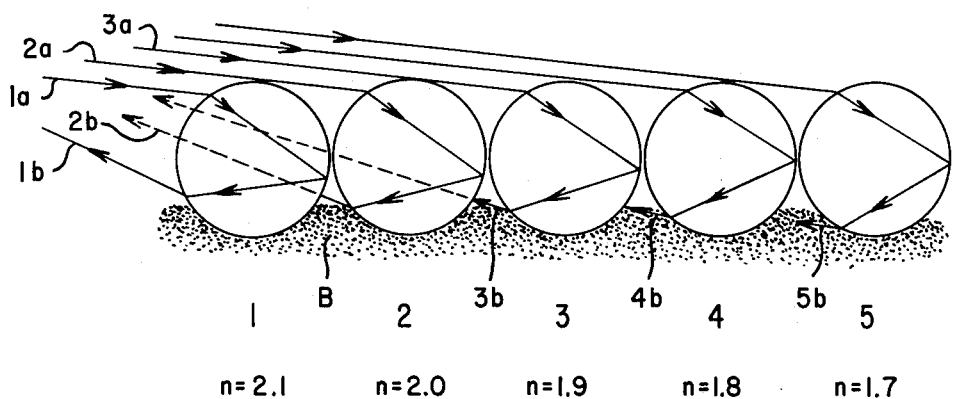
FIGURE 3 is an enlarged diagrammatic view showing several glass beads of different indices of refraction and respective incident rays.

Manifestly an incident of light projected against a glass beaded black top roadway would not be expected to be retroreflected because of the light absorbing backing in the form of tar or asphalt. However, retroreflection is achieved in spite of the light absorbing backing by employing a sufficient quantity of spherical glass beads of relatively high indices of refraction. In the first place, it will be understood that the angle at which the light beam from the motor vehicle head light strikes the road surface is between 1.5 to 5 degrees depending upon the distance and elevation of the head lights above the surface. Under such conditions only the tops of the individual beads are illuminated so that it is necessary to consider the refraction of the peripheral rather than the paraxial rays. FIGURE 3 shows five beads of equal size numbered 1 to 5 and associated with each bead is the refractive index for the particular beads, for example bead 1 has an index of refraction of 2.1 This figure illustrates the criterion of performance and shows how the light rays incident at a small or grazing angle become refracted and reflected in such manner that they point upwardly rather than downwardly where they would be absorbed by the black backing. In each case peripheral rays are shown incident upon the surface of a glass bead at an angle of 60 degrees which corresponds to a grazing angle of approximately 5 degrees as from a motor vehicle head light to be perceived by the driver under typical conditions. Considering the glass bead 1 having a refractive index of 2.1, the incident ray $1a$ is refracted and reflected back as indicated at $1b$ with sufficient elevation to avoid the black asphalt backing B and to penetrate the preceding bead (not shown) almost axially (i.e. without further refraction and deviation) on its way out in retrograde direction. This obtains also for the bead 2 which has an index of refraction of 2.0 wherein the incident ray $2a$ is refracted and reflected back as indicated at $2b$ but the latter is at a lower elevation or closer to the asphalt backing B than the ray $1b$. The ray $3b$ for the bead 3 with an index of refraction of 1.9 barely skims the backing B between the beads, the incident ray being indicated at $3a$ For each of the beads 4 and 5 which have indices of refraction of 1.8 and 1.7 respectively, the reflected rays $4b$ and $5b$ do not have sufficient elevation but are intercepted and absorbed by the black backing B.

From the above it is clear that in order to achieve proper illumination of roadways having a light absorbing backing, the spherical glass beads must have a refractive index of 1.9 or greater and empirically it is found that a quantity of such beads distributed over the surface of such roadway affords an exceedingly satisfactory illumination without glare or annoying effect to the driver of the motor vehicle. Desirably the beads should be of a size between 20 and 100 mesh and beads of lower refractive indices may be used as a filler.

As hereinbefore mentioned, the glass beads may be appropriately colored so as not only to afford specular reflection from head lamp rays but also to create traffic or directional signals of standard or well known forms. For example, green beads indicate a lane of clear proper travel whereas red beads indicate areas where traffic is forbidden. These colored beads would be visible not only at night but would also be apparent during the daytime. They may be arranged at crossings entirely across a light absorbing highway or in lanes or cross strips. Thus a lane or stripe colored blue for example would direct a traveler along a certain predetermined course and another color would be used for designating a different route.

Numerous changes in details of choice of materials, application of the beads, and arrangement may be effected without departing from the spirit of the invention, especially as defined in the appended claims.

What I claim is:

1. A vehicle roadway comprising in combination at least a relatively dark light absorbing top surface and macroscopic glass beads of a size between 20 and 100 mesh, said glass beads extending across the entire area of said light absorbing top surface and being partially embedded therein in closely packed relationship, certain of said beads projecting from said light absorbing top surface and each of said beads having a refractive index of at least 1.9 to provide a specular reflective layer on said light absorbing top surface responsive to peripheral light rays from vehicle head lamps impinging thereon at grazing angles of from about 1.5 to about 5 degrees.

2. A vehicle roadway as claimed in claim 1 in which the beads are colored selectively to reflect from vehicle head lamp rays a color to designate predetermined traffic signals.

References Cited by the Examiner

UNITED STATES PATENTS

| 2,070,432 | 2/37 | Huebscher | 94—1.5 |
| 2,345,644 | 4/44 | Weber. | |
| 2,355,430 | 8/44 | Flood | 94—1.5 |
| 2,366,715 | 1/45 | French | 94—1.5 |
| 2,366,754 | 1/45 | Rodli | 94—1.5 |
| 2,574,971 | 11/51 | Heltzer. | |
| 2,838,408 | 6/58 | Rindone | 94—1.5 |
| 3,103,859 | 9/63 | Dye | 94—1.5 X |

OTHER REFERENCES

Engineering News Record, Jan. 20, 1949, page 101.
Manual of Uniform Traffic Control Devices for Streets and Highways, by the Public Roads Adm., pages 76, 91, 94, August 1948.
Municipal South, February 1960, pages 17, 18, and 20.
Cornell Aeronautical Lab. Inc., of Cornell Univ., P. O. Box 235, Buffalo, New York, Jan. 22, 1961.

JACOB L. NACKENOFF, *Primary Examiner.*